United States Patent
Haase et al.

(10) Patent No.: US 10,728,037 B2
(45) Date of Patent: Jul. 28, 2020

(54) METHOD FOR AUTHENTICATING A FIELD DEVICE OF AUTOMATION TECHNOLOGY

(71) Applicant: Endress+Hauser Conducta GmbH+Co. KG, Gerlingen (DE)

(72) Inventors: Björn Haase, Stuttgart (DE); Ralf Schmidt, Kembs (FR); Markus Kilian, Merzhausen (DE); Helmut Kalteis, Marktoberdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 290 days.

(21) Appl. No.: 15/890,851

(22) Filed: Feb. 7, 2018

(65) Prior Publication Data

US 2018/0234249 A1 Aug. 16, 2018

(30) Foreign Application Priority Data

Feb. 10, 2017 (DE) .......... 10 2017 102 677

(51) Int. Cl.
*H04L 9/32* (2006.01)
*H04L 9/08* (2006.01)
*H04L 29/06* (2006.01)

(52) U.S. Cl.
CPC .......... *H04L 9/3242* (2013.01); *H04L 9/0897* (2013.01); *H04L 9/3247* (2013.01);
(Continued)

(58) Field of Classification Search
CPC . H04L 9/3242; H04L 63/123; H04L 63/0442; H04L 9/3297; H04L 9/3247;
(Continued)

(56) References Cited

U.S. PATENT DOCUMENTS

| 9,495,717 B2 * | 11/2016 | Anzai | G06Q 10/06 |
| 10,042,354 B2 * | 8/2018 | Chand | G06F 21/54 |

(Continued)

FOREIGN PATENT DOCUMENTS

| DE | 102007034525 B4 | 2/2010 |
| DE | 102009051383 A1 | 5/2011 |

(Continued)

OTHER PUBLICATIONS

Search Report for German Patent Application No. 10 2017 102 677.0, German Patent Office, dated Feb. 10, 2017 8 pp.

*Primary Examiner* — Christopher A Revak
(74) *Attorney, Agent, or Firm* — Mark A. Logan; Endress + Hauser (USA) Holding Inc.

(57) ABSTRACT

The present disclosure includes a method for authenticating a field device of automation technology with respect to a destination device. A telegram is created by the field device, which telegram includes a first data field and at least a second data field. The first data field includes information on the status of the field device and/or of the device components of the field device and/or information on the device parameterization/configuration, and a sequence counter or a time stamp. Security data are generated from the first data field via a cryptographic method, which security data are stored in the second data field. The telegram is transmitted from the field device to the destination device, wherein the destination device verifies the second data field as to authenticity or integrity upon receipt of the telegram, and wherein a first alarm is generated if the authenticity or the integrity of the second data field is not successfully verified.

16 Claims, 1 Drawing Sheet

(52) U.S. Cl.
CPC ........ *H04L 9/3297* (2013.01); *H04L 63/0442* (2013.01); *H04L 63/123* (2013.01)

(58) Field of Classification Search
CPC ... H04L 9/0897; H04L 67/025; H04L 63/083; H04L 63/0428; H04L 9/0877
See application file for complete search history.

(56) References Cited

U.S. PATENT DOCUMENTS

| | | | | |
|---|---|---|---|---|
| 10,402,190 | B2* | 9/2019 | Haase | G06F 21/44 |
| 2014/0047568 | A1* | 2/2014 | Falk | G06F 21/86 |
| | | | | 726/34 |
| 2016/0245676 | A1* | 8/2016 | Bierbaum | G05B 19/0428 |
| 2019/0289020 | A1* | 9/2019 | Heintel | H04L 63/08 |

FOREIGN PATENT DOCUMENTS

| | | | |
|---|---|---|---|
| DE | 102012217743 A1 | 4/2014 | |
| DE | 112005003485 T5 | 7/2014 | |
| DE | 102015213412 A1 | 1/2017 | |
| WO | WO 2018/059852 A1 * | 4/2018 | ............. G06F 21/64 |

* cited by examiner

METHOD FOR AUTHENTICATING A FIELD DEVICE OF AUTOMATION TECHNOLOGY

CROSS-REFERENCE TO RELATED APPLICATION

The present application is related to and claims the priority benefit of German Patent Application No. 10 2017 102 677.0, filed on Feb. 10, 2017, the entire contents of which are incorporated herein by reference.

TECHNICAL FIELD

The present disclosure relates to a method for authenticating a field device of automation technology with respect to a destination device.

BACKGROUND

Field devices are already known from the prior art that are used in industrial installations. Field devices are often used in process automation, as well as in manufacturing. Field devices, in general, refer to all devices which are process-oriented and which supply or process process-relevant information. Field devices are thus used for detecting and/or influencing process variables. Measuring devices, such as sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or general devices that are arranged at the field level.

A variety of such field devices are produced and marketed by the Endress+Hauser group.

In modern industrial plants, field devices are usually connected via communications networks, such as fieldbuses (Profibus®, FOUNDATION® Fieldbus, HART®, etc.), to higher-level units. Higher-level units are control units, such as an SPS (storage programmable controller) or a PLC (programmable logic controller). The higher-level units are used for, among other things, process control, as well as for commissioning of the field devices. The measured values detected by the field devices—in particular, by sensors—are transmitted via the respective bus system to a (or possibly several) higher-level unit(s) that further processes the measured values, as appropriate, and relays them to the control station of the plant. The control station is used for process visualization, process monitoring, and process control over the higher-level units. In addition, a data transfer is required from the higher-level unit via the bus system to the field devices—in particular, for configuration and parameterization of field devices, as well as for control of actuators.

The functional scope of modern field devices that are produced and marketed by the applicant includes the so-called "heartbeat" technology. This diagnostic method allows information to be collected that permits conclusions about the correct function or about the accuracy of a field device, or of its components. This currently includes, in particular, the measurement function of the field device and the correct operation of its transmitter electronics. In this context, the field device creates a status message periodically or at other appropriate instants that includes information about the "device health."

Within the meaning of the German term, "Sicherheit," which in the American equivalent includes the meanings of "security" and "safety," only the "safety" part is covered by the field devices known in the prior art.

The term, "safety," can be generally described by the term, "accident prevention." For this purpose, functions are implemented in field devices that protect people in the area surrounding the field device and the environment of the field device itself. For example, certain field-device housings are specially designed in order to permit safe operation of the field device in potentially explosive environments of a plant.

The term, "security," indicates the prevention of tampering with field device by third parties. It is sought in this manner to protect a field device from being able to be sabotaged by an unauthorized party, or from security functions, for example, being able to be switched off and/or device parameters of the field device to be changed through unauthorized intervention.

In particular, an unauthorized party is, therefore, currently not prevented from installing a "fake" device in the plant that, from the viewpoint of the control system, behaves exactly like a correctly functioning field device and therefore cannot be distinguished from an authentic field device.

In addition, while the heartbeat technology known from the prior art in fact includes information on device function, possible error sources are, however, not discovered that may arise because of erroneous or deliberate tampering with device parameters.

SUMMARY

In the light of this problem, the aim of the present disclosure is to introduce a method that allows a field device of automation technology to be checked, including for error functions and unauthorized alterations.

The aim is achieved by a method for authentication of a field device of automation technology with respect to a destination device—in particular, to a higher-level unit, a plant asset management system, a remotely-arranged server, or a computer unit of a control station of the plant in which the field device is installed, wherein a telegram is generated by a field device, which telegram includes a first data field and at least a second data field, which first data field contains information on the status of the field device and/or of device components of the field device and/or information on the device parameterization/configuration as well as a sequence counter or a time stamp, wherein security data are generated from the first data field via a cryptographic method, which security data are stored in the second data field, wherein the telegram is transmitted from the field device to the destination device, wherein, upon reception of the telegram, the destination device verifies the second data field as to authenticity or integrity, and wherein a first alarm is generated if the authenticity or the integrity of the second data field is not successfully verified.

The great advantage of the method according to the present disclosure is that the aforementioned disadvantages of the prior art can be eliminated in a simple and efficient manner. The telegram sent from the field device is tested by the control center in such a manner that it can be reliably determined whether the field device is authentic, i.e., has not been tampered with or replaced by an unauthorized person, or whether the integrity of the information transmitted by the field device is guaranteed. If this integrity is confirmed, it is thus guaranteed that the information found in the telegram received from the destination device is the same as that which was sent from the field device, and that this information was therefore not tampered with along the transmission link between the field device and the destination device.

Other than the indicated first data field and the indicated second data field, the telegram has additional components such as a header, which includes the addressing of the telegram, and a checksum.

Field devices that are mentioned in connection with the present disclosure are already given as examples in the introductory part of the description.

According to a first variant of the method according to the present disclosure, it is provided that an asymmetric signature method which uses a first key and a second key corresponding to the first key be used as the cryptographic method, wherein the first key is stored in the field device, and wherein the second key is stored in the destination device.

In an advantageous embodiment of the first variant of the method according to the present disclosure, it is provided that the field device, using the first key, create, as security data, a checksum from the first data field—in particular, using a cryptographic algorithm, such as RSA, DSA, ECDSA, or EdDSA—and wherein, using the second key, the destination device tests the authenticity of the checksum stored in the second data field. The authenticity is thereby tested in that the destination device converts, using the second key, the contents of the first data field from the checksum and compares it to the actual first data field contained in the received telegram. In the case of an agreement, the authenticity of the field device is verified. In the case where the telegram contains no checksum, or where the checksum is erroneous because of ignorance of the first key, which is indicated by a deviation in the calculated contents of the first data field, the authenticity of the field device cannot be proven. In one variant, alternative methods, such as hash-based signature methods like so-called Merkle trees, can be used.

According to a first variant of the method according to the present disclosure, it is provided that a symmetric message-authentication code method—in particular, HMAC-SHA 2, HMAC-MD5, Poly 1305, or AES-CBC—be used as the cryptographic method, wherein the field device, using a third key, creates from the first data field a message-authentication code as security data, wherein the third key is stored in the field device as well as in the destination device, and wherein the destination device verifies the integrity of the message-authentication code. The integrity is thereby verified in that the destination device also creates such a message-authentication code from the received telegram and the third key and compares the two message-authentication codes to each other. In the case of an agreement, the integrity of the field device is verified. In the case where the telegram is tampered with along the transmission link by an unauthorized party, the contents of the information contained in the telegram is changed. The method-authentication code calculated by the destination device thereby also differs and varies from the message-authentication code created by the field device.

One preferred embodiment of the method provides that the first key or the third key be stored in a specially protected hardware chip in the field device—in particular, in a smart card IC. This hardware chip is designed so that its contents cannot be tampered with and, in particular, also not read off by an unauthorized party.

In one advantageous embodiment of the method according to the present disclosure, it is provided that the checksum or the message-authentication code be calculated by the hardware chip.

In an advantageous embodiment of the method according to the present disclosure, it is provided that, after successful verification of the authenticity or integrity, it be verified whether the sequence counter and/or the time stamp have a valid value. In this manner, a possible replay attack by an unauthorized party can be detected, in which the unauthorized party transmits previously logged data, i.e., for example, a previously logged, "correct" telegram from the field device, in order to fake an authorized identity so as to connect with the destination device via, for instance, an operator control unit.

The sequence counter contains the current number of a telegram. This is, in particular, a number one higher than the number of the previously transmitted telegram. If the destination device then receives a telegram whose authenticity or integrity, while confirmed, contains an already-received telegram number, this is then an indication of a replay attack.

The method with use of a time stamp is similar. This contains the date and time at which the telegram was created by the field device. If the destination device then receives a telegram whose authenticity or integrity, while confirmed, contains a time stamp that differs from the current date, this is then an indication of a replay attack.

In one advantageous embodiment of the method according to the present disclosure, it is provided that a second alarm be generated if the sequence counter and/or the time stamp do not have a valid value. It can be provided, for example, that, upon the triggering of such an alarm, the address of the sender of the telegram be automatically blocked in order to protect the plant from an unauthorized access.

In one advantageous embodiment of the method according to the present disclosure, it is provided that the first data field be verified as to alterations in the status of the device components and/or as to alterations in the device parameterization/configuration. Tampering of the field device by an unauthorized party can be easily detected in this manner.

In one advantageous embodiment of the method according to the present disclosure, it is provided that a third alarm be generated if an alteration in the status of the device components and/or an alteration in the device parameterization/configuration is detected that was not previously made known to the destination device. Here, too, it can be provided that, upon the triggering of such an alarm, the address of the sender of the telegram be automatically blocked in order to protect the plant from an unauthorized access.

According to one advantageous development of the method according to the present disclosure, it is provided that the telegram from the field device be transmitted as encrypted. Even if an unauthorized party succeeds in capturing a telegram from the field device, it is impossible for him to access its contents without knowledge of the key.

In one preferred embodiment of the method according to the present disclosure, it is provided that the first and the second keys, the third key, or at least a new key are used for the encryption of the telegram.

According to one advantageous embodiment of the method according to the present disclosure, it is provided that a hash value be calculated from the information on the status of device components of the field device and/or the information on the device parameterization/configuration—in particular, according to one of the standards SHA-1, SHA-2, SHA-3, MD5, or RIPM160—that, instead of the information on the status of components of the field device (FG) or the information on the device parameterization/configuration, is stored in the first data field. In this manner, the file size of the telegram can be reduced.

One preferred embodiment of the method according to the present disclosure provides that the telegram be created by the field device at specified time points or on the initiative of the destination device, and transmitted to the destination device. The telegram is, for example, a "heartbeat" telegram mentioned in the introduction of the description, or a telegram generated in the normal operation of the field device by a cyclical and/or acyclical query.

It can also be advantageously provided that the first and the second data fields in the telegram be available in a DER data format in accordance with the X908 standard.

BRIEF DESCRIPTION OF THE DRAWINGS

The present disclosure is explained in greater detail with reference to the following figures. These show.

DETAILED DESCRIPTION

Figure 1:
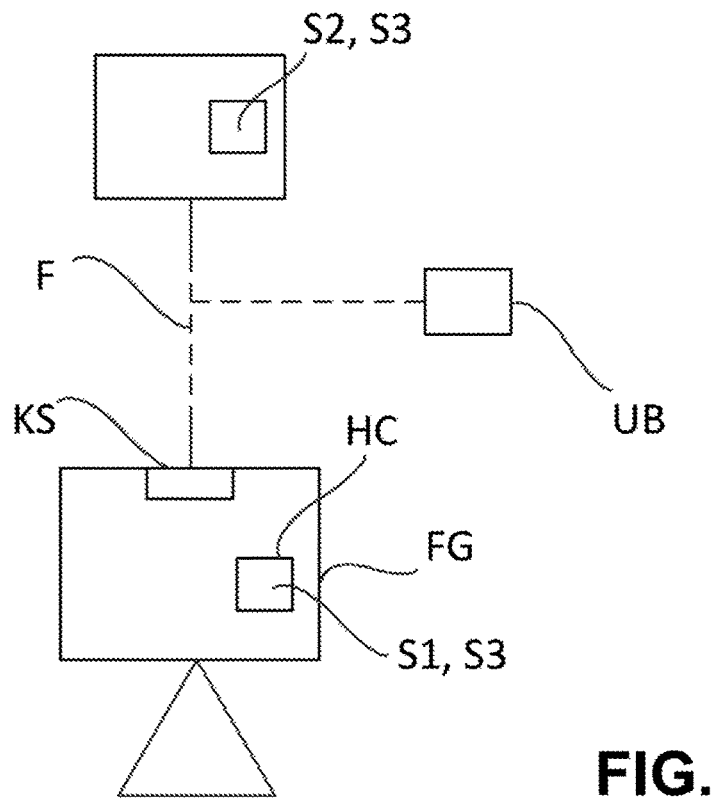
FIG. 1 shows a schematic overview of an application example of the method according to the present disclosure.

FIG. 1 shows a schematic overview of an application example of the method according to the present disclosure. A field device FG is shown, which is placed into a measuring station of a process installation. Field device FG is a field device of process automation for measuring a process variable, such as the pressure or the flow-rate value in a pipe. Additional applications of such a field device FG have already been explained in detail in the introductory part of the description.

This field device FG is connected to a destination device GS via a communications interface KS. Communications interface KS is, for example, a fieldbus interface integrated into field device FG—for example, in accordance with the Ethernet, HART, Profibus, Modbus, or Foundation Fieldbus standard. In such a case, field device FG is in communication connection via a communications network F—in particular, via a fieldbus F—with other field devices and a management level having one or more higher-level units. Destination device GS represents, in particular, one component of the management level, e.g., a workstation PC, or else a server arranged at a distance from the installation—in particular, a cloud-enabled server—that is connected via the internet to one or more components of the installation—for example, also directly to field device FG.

Alternatively, field device FG, alongside communications interface KS for communication with the fieldbus, provides an additional communications interface for establishing an additional communications channel to destination device GS independent of field device FG. In such a case, destination device GS is, in particular, a mobile operating control unit such as the "Field Xpert" produced and marketed by the applicant or a mobile terminal device such as a smartphone or a tablet.

It is relevant in the context of the method according to the present disclosure that field device FG be in communication with a destination device and transmit telegrams TG to this, wherein destination device GS receives and processes these telegrams TG.

Figure 2A:
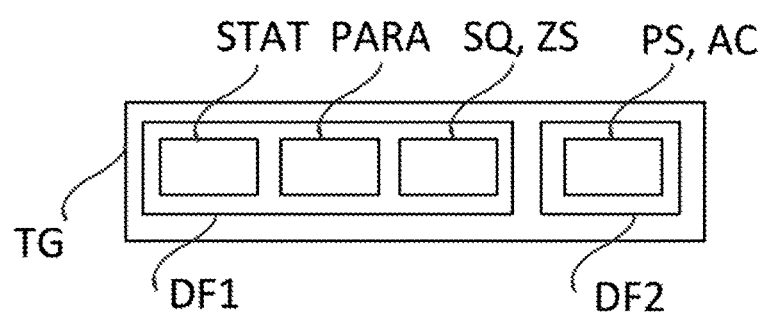
FIG. 2A shows an exemplary embodiment of the telegram transmitted from the field device in the context of the method according to the present disclosure.
Figure 2B:
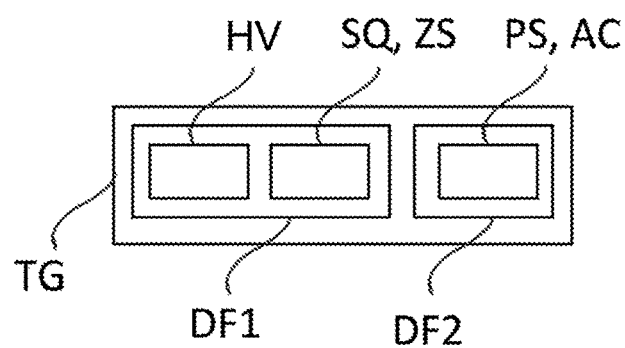
FIG. 2B shows an exemplary embodiment of the telegram including a hash value HV.

These telegrams TG shown in FIGS. 2A and 2B contain several partial elements in the form of a first data field DF1 and a second data field DF2.

FIG. 2A shows information on the device parameterization PARA is also located in data field DF1, along with the data elements about the "health status" of the hardware components STAT known from the prior art. This can be accomplished, for example, in that all the parameters relevant to the function are transmitted with each telegram TG. Such a first data field DF1 is shown in telegram TG, which is depicted in FIG. 2A.

Along with these data elements STAT, PARA, the first data field can also include data fields such as a stringing together of the following additional data fields (not shown in FIG. 2A): configurable device parameterization, hardware identification, and device software identification such as firmware object codes for recognition of bit errors in the flash storage. This process, however, has the disadvantage that the data volume of telegram TG can become very large (possibly up to a megabyte), or that the contents shall not be outputted (confidentiality). Advantageously, instead of the complete data set, a so-called hash value HV can be integrated across the different data elements STAT, PARA, e.g., in accordance with one of the hash standards SHA1, SHA-2, SHA-3, MD5, RIPM160 or the like. Advantageously, a cryptographically secure hash algorithm is used that prevents intentional tampering. Such a first data field DF1 having a hash value HV is shown in telegram TG illustrated in FIG. 2B.

Advantageously, first data field DF1 is further supplemented by means of a data element that prevents so-called "replay" attacks—for example, a continuous sequence counter SQ or a time stamp ZS.

This first data field DF1 is then cryptographically secured via a cryptographic authentication method. A second data element is received as a result that includes all information relevant to security, in the sense of "safety." The data located in this data element are referred to below as security data PS, AC.

Two method classes are possible here, viz., so-called symmetric message authentication codes and asymmetric signature methods.

In both method classes, it is essential that cryptographic keys S1, S2, S3 must be available at both communication partners FG, GS.

Advantageously, keys S1, S2, S3 and parts of the cryptographic checksum calculation are thereby executed in the field device in specially protected hardware chips HC—so-called smart card IC's. This makes it difficult for an unauthorized party to "loot" the key information from a stolen field device.

Security data PS, AC calculated using the cryptographic authentication method are written, according to the method used, in the form of a checksum PS or a message-authentication code AC in a second data field DF2 of telegram TG.

Telegram TG transmitted to a destination device can contain either such a checksum PS or such a message authentication code AC, or both. In order to link individual data fields DF1, DF2 or data elements STAT, PARA, HV, PS, AC contained in data fields DF1, DF2, data formats such as DER or the X908 standard, or a simple stringing together of data fields DF1, DF2 can be used. Aside from referenced first data field DF1 and referenced second data field DF2, telegram TG typically has additional components, such as a header, which includes the addressing of the telegram, and a checksum.

The destination device receives telegram TG with the two data fields DF1, DF2 and, according to the cryptographic authentication method used, first conducts a security verification. To do this, it is verified via checksum PS whether the creator of the message was in possession of authentic cryptographic keys S1, S2.

In a possible second step, it is verified whether time stamp ZS or sequence counter SQ of the message is uncorrupted, or if it is possibly a repeated input of a telegram TG intercepted by an unauthorized party UB that has tapped into the communications channel using an operator control unit.

Next, first data field DF1, now recognized as authentic, is evaluated. A critical alteration in the device properties/settings via an alteration (for example, a changed hash value #) can be detected here.

In addition, the evaluation known from the prior art of the data for the device state ("heartbeat") can be executed. In the overall result, state information can be determined that, along with the proper functioning of the hardware, also includes the security and safety aspects.

In one advantageous embodiment, transmitted telegram TG is also encrypted. To do this, the same keys S1, S2, S3 or, alternatively, different keys than these, which are used for the authentication verification, can be used.

The invention claimed is:

1. A method for an authentication of a field device of automation technology with respect to a destination device including a higher-level unit, a plant asset management system, a remotely-arranged server, or a calculator unit of a control center of an installation in which the field device is used, comprising:
    creating a telegram by the field device, the telegram including a first data field and at least a second data field, wherein the first data field includes information on the status of the field device and of device components of the field device and information on field device parameterization and configuration, wherein the telegram further includes a sequence counter or a time stamp;
    generating security data from the first data field using a cryptographic method;
    storing the security data in the second data field;
    transmitting the telegram from the field device to the destination device;
    verifying the second data field as to authenticity or integrity upon receipt of the telegram by the destination device; and
    generating a first alarm if the authenticity or the integrity of the second data field is not successfully verified.

2. The method according to claim 1,
    wherein the cryptographic method includes an asymmetric signature method using a first key and a second key belonging to the first key, and
    wherein the first key is stored in the field device and the second key is stored in the destination device.

3. The method according to claim 2, wherein the security data includes a checksum calculated from the first data field using the first key and a cryptographic algorithm including RSA, DSA ECDSA, or EdDSA, the method further comprising:
    checking by the destination device using the second key the authenticity of the checksum stored in the second data field.

4. The method according to claim 1, wherein the cryptographic method includes a symmetric message-authentication code method including HMAC-SHA 2, HMAC-MD5, Poly 1305, or AES-CBC,
    wherein the security data includes a message-authentication code generated by the field device using a third key and the first data field, and
    wherein the third key is stored in the field device and in the destination device, the method further comprising:
    verifying by the destination device using the third key the integrity of the message-authentication code.

5. The method according to claim 3, wherein the first key is stored in a specially protected hardware chip in the field device.

6. The method according to claim 4, wherein the third key is stored in a specially protected hardware chip in the field device.

7. The method according to claim 5, wherein the checksum is calculated by the specially protected hardware chip.

8. The method according to claim 5, wherein the message-authentication code is calculated by the specially protected hardware chip.

9. The method according to claim 1, further comprising:
    after successfully verifying the authenticity or the integrity of the second data field, verifying the validity of the sequence counter and/or the time stamp.

10. The method according to claim 9, further comprising:
    generating a second alarm if the sequence counter and/or the time stamp is not valid.

11. The method according to claim 1, further comprising:
    testing by the destination device the first data field for alterations of the status of the device components of the field device and for alterations to the information on the field device parameterization and configuration.

12. The method according to claim 11, further comprising:
    generating by the destination device a third alarm if an alteration of the status of the device components of the field device and/or an alteration to the information on the field device parameterization and configuration is detected that was not previously made known to the destination device.

13. The method according to claim 2, further comprising:
    encrypting the telegram before transmitting the telegram from the field device.

14. The method according to claim 13, wherein the first key, the second key, or at least one new key are used for encrypting the telegram.

15. The method according to claim 1, further comprising:
    calculating a hash value from the information on the status of device components of the field device and/or the information on the device parameterization/configuration according to one of the standards SHA-1, SHA-2, SHA-3, MD5, and RIPM160; and
    storing the hash value in the first data field in place of the information on the status of components of the field device and/or of the information on the device parameterization/configuration.

16. The method according to claim 1, wherein the telegram is generated by the field device at specified time points or on the initiative of the destination device and transmitted to the destination device.

* * * * *